(12) United States Patent
Kim et al.

(10) Patent No.: US 12,362,100 B2
(45) Date of Patent: *Jul. 15, 2025

(54) MULTILAYER ELECTRONIC COMPONENT FOR ENHANCED MOISTURE RESISTANCE AND BENDING STRENGTH

(71) Applicant: SAMSUNG ELECTRO-MECHANICS CO., LTD., Suwon-si (KR)

(72) Inventors: Dong Yeong Kim, Suwon-si (KR); Ji Hong Jo, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,090

(22) Filed: Nov. 20, 2023

(65) Prior Publication Data

US 2024/0096558 A1  Mar. 21, 2024

Related U.S. Application Data

(63) Continuation of application No. 17/825,289, filed on May 26, 2022, now Pat. No. 11,862,404, which is a (Continued)

(30) Foreign Application Priority Data

Aug. 28, 2019 (KR) .................. 10-2019-0105819

(51) Int. Cl.
*H01G 4/30* (2006.01)
*H01G 2/02* (2006.01)
(Continued)

(52) U.S. Cl.
CPC .................. *H01G 4/30* (2013.01); *H01G 2/02* (2013.01); *H01G 4/008* (2013.01); *H01G 4/012* (2013.01);
(Continued)

(58) Field of Classification Search
CPC ............ H01G 4/30; H01G 2/02; H01G 4/008; H01G 4/012; H01G 4/1218; H01G 4/2325;
(Continued)

(56) References Cited

U.S. PATENT DOCUMENTS 8,861,181 B2   10/2014  Lee et al.
10,186,378 B2   1/2019  Hamanaka et al.
(Continued)

FOREIGN PATENT DOCUMENTS

CN    101901688 A    12/2010
CN    103310977 A     9/2013
(Continued)

OTHER PUBLICATIONS

Office Action issued in corresponding Korean Patent Application No. 10-2021-0080997 dated Mar. 22, 2023, with English translation.
(Continued)

*Primary Examiner* — Nathan Milakovich
*Assistant Examiner* — Daniel M Dubuisson
(74) *Attorney, Agent, or Firm* — MORGAN, LEWIS & BOCKIUS LLP (57) ABSTRACT

A multilayer electronic component includes a silicon (Si) organic compound layer having a body cover portion disposed in a region, in which electrode layers are not disposed, of external surfaces of a body, and an extending portion disposed to extend from the body cover portion between an electrode layer and a conductive resin layer of an external
(Continued)

electrode, and thus, may improve bending strength and humidity resistance reliability.

16 Claims, 8 Drawing Sheets

Related U.S. Application Data continuation of application No. 16/836,125, filed on Mar. 31, 2020, now Pat. No. 11,501,922.

(51) Int. Cl.
*H01G 4/008* (2006.01)
*H01G 4/012* (2006.01)
*H01G 4/12* (2006.01)
*H01G 4/224* (2006.01)
*H01G 4/232* (2006.01)

(52) U.S. Cl.
CPC ......... *H01G 4/1218* (2013.01); *H01G 4/2325* (2013.01)

(58) Field of Classification Search
CPC ........ H01G 4/224; H01G 4/232; H01G 4/005; H01G 4/0085; H01G 4/14
See application file for complete search history.

(56) References Cited

U.S. PATENT DOCUMENTS

| | | | |
|---|---|---|---|
| 10,366,834 B1 | 7/2019 | Lee et al. | |
| 10,395,840 B1 | 8/2019 | Park et al. | |
| 11,393,630 B2 | 7/2022 | Yi et al. | |
| 11,501,922 B2 * | 11/2022 | Kim | H01G 4/012 |
| 11,636,984 B2 | 4/2023 | Yi et al. | |
| 11,862,404 B2 * | 1/2024 | Kim | H01G 4/30 |
| 2010/0039748 A1 | 2/2010 | Fujii et al. | |
| 2010/0302704 A1 | 12/2010 | Ogawa et al. | |
| 2013/0242457 A1 | 9/2013 | Lee et al. | |
| 2016/0042864 A1 | 2/2016 | Hong et al. | |
| 2016/0172110 A1 | 6/2016 | Otani et al. | |
| 2018/0166215 A1 | 6/2018 | Hamanaka et al. | |
| 2019/0131076 A1 | 5/2019 | Fukumura | |

FOREIGN PATENT DOCUMENTS

| | | |
|---|---|---|
| CN | 104681276 A | 6/2015 |
| CN | 109727770 A | 5/2019 |
| CN | 110176355 A | 8/2019 |
| JP | 2010-278173 A | 12/2010 |
| JP | 2010-278373 A | 12/2010 |
| JP | 2018-098475 A | 6/2018 |
| JP | 2019-083291 A | 5/2019 |
| KR | 10-2019-0049479 A | 5/2019 |

OTHER PUBLICATIONS

Chinese Office Action dated Sep. 15, 2022, issued in corresponding Chinese Patent Application No. 202010476006.1.
Chinese Office Action dated Jul. 27, 2022, issued in corresponding Chinese Patent Application No. 202010688179.X.
Notice of Allowance issued in corresponding U.S. Appl. No. 17/825,289 dated Aug. 21, 2023.
Final Office Action issued in corresponding U.S. Appl. No. 17/825,289 dated May 9, 2023.
Office Action issued in corresponding U.S. Appl. No. 17/825,289 dated Oct. 28, 2022.
Office Action issued in corresponding Japanese Patent Application No. 2020-114053 issued on Mar. 19, 2024, with English translation.

* cited by examiner

MULTILAYER ELECTRONIC COMPONENT FOR ENHANCED MOISTURE RESISTANCE AND BENDING STRENGTH

CROSS-REFERENCE TO RELATED APPLICATION(S)

The present application is a continuation of U.S. patent application Ser. No. 17/825,289 filed on May 26, 2022, which is a continuation of U.S. patent application Ser. No. 16/836,125 filed on Mar. 31, 2020, now U.S. Pat. No. 11,501,922, which claims the benefit of priority to Korean Patent Application No. 10-2019-0105819 filed on Aug. 28, 2019 in the Korean Intellectual Property Office, the entire disclosures of which are incorporated herein by reference.

BACKGROUND

1. Field

The present disclosure relates to a multilayer electronic component.

2. Description of Related Art

A multilayer ceramic capacitor (MLCC), a type of multilayer electronic component, may be a chip type capacitor mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors is increasing.

In addition, as recent interest in vehicle electric/electronic components has increased, multilayer ceramic capacitors have also come to require relatively high reliability and strength characteristics to be used in vehicle or infotainment systems.

In order to secure high-reliability and high-strength characteristics, a method of changing a conventional external electrode, including an electrode layer, to have a double-layer structure including an electrode layer and a conductive resin layer has been proposed. In the double-layer structure including the electrode layer and the conductive resin layer, a resin composition, including a conductive material, is applied onto the electrode layer to absorb external impacts and to prevent permeation of plating liquid. As a result, reliability may be improved.

However, as electric vehicles, autonomous vehicles, and the like, have been developed in the automotive industry, a greater number of multilayer ceramic capacitors are required, and multilayer ceramic capacitors, used in automobiles and the like, are required to have stricter humidity resistance reliability conditions and bending strength characteristics secured therein.

SUMMARY

An aspect of the present disclosure is to provide a multilayer electronic component having improved bending strength characteristics.

An aspect of the present disclosure is to provide a multilayer electronic component having improved humidity resistance reliability.

An aspect of the present disclosure is to provide a multilayer electronic component having low equivalent series resistance (ESR).

However, the objects of the present disclosure are not limited to the above description, and will be more easily understood in the process of describing specific embodiments of the present disclosure.

According to an aspect of the present disclosure, a multilayer electronic component includes a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other. The multilayer electronic component further includes a first external electrode including a first electrode layer connected to the first internal electrode and a first conductive resin layer disposed on the first electrode layer, and having a first connection portion disposed on the third surface of the body and a first band portion extending from the first connection portion to a portion of each of the first, second, fifth, and sixth surfaces. The multilayer electronic component further includes a second external electrode including a second electrode layer connected to the second internal electrode and a second conductive resin layer disposed on the second electrode layer, and having a second connection portion disposed on the fourth surface of the body and a second band portion extending from the second connection portion to a portion of each of the first, second, fifth, and sixth surfaces. The multilayer electronic component still further includes a silicon (Si) organic compound layer having a body cover portion disposed on a region of external surfaces of the body between the first and second electrode layers, a first extending portion extending from the body cover portion to a region between the first electrode layer and the first conductive resin layer of the first band portion, and a second extending portion extending from the body cover portion to a region between the second electrode layer and the second conductive resin layer of the second band portion.

According to another aspect of the present disclosure, a multilayer electronic component includes a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other. The multilayer electronic component further includes a first external electrode including a first electrode layer connected to the first internal electrode and a first conductive resin layer disposed on the first electrode layer, and having a first connection portion disposed on the third surface of the body and a first band portion extending from the first connection portion to a portion of each of the first, second, fifth, and sixth surfaces. The multilayer electronic component further includes a second external electrode including a second electrode layer connected to the second internal electrode and a second conductive resin layer disposed on the second electrode layer, and having a second connection portion disposed on the fourth surface of the body and a second band portion extending from the second connection portion to a portion of each of the first, second, fifth, and sixth surfaces. The multilayer electronic component still further includes a silicon (Si) organic compound layer having a body cover portion disposed on a region of external surfaces of the body between the first and second electrode layers, a first extending portion extending from the body cover portion to a region between the first electrode layer and the first conductive resin layer, and a second extending portion extending from the body cover portion to a region between the second electrode layer and the second conductive resin layer. The first and second extending portions have first and second openings, respectively.

According to still another aspect of the present disclosure, a multilayer electronic component includes a body including dielectric layers, and first and second internal electrodes alternately stacked with respective dielectric layers interposed therebetween in a stacking direction, the first and second internal electrodes being exposed to opposing end surfaces of the body in a length direction perpendicular to the stacking direction. The multilayer electronic component further includes first and second external electrodes including first and second electrode layers disposed on the end surfaces of the body and connected to the first and second internal electrodes, respectively, the first and second electrode layers further extending inwardly in the length direction along surfaces of the body that connect the end surfaces to each other. The multilayer electronic component further includes a silicon (Si) organic compound layer disposed to cover exterior surfaces of the body and the first and second electrode layers. The first and second external electrodes further include first and second conductive resin layers enclosing the first and second electrode layers, respectively. The Si organic compound layer has one or more first openings between the first electrode layer and the first conductive resin layer so as to expose the first electrode layer to the first conductive resin layer through the one or more first openings, and has one or more second openings between the second electrode layer and the second conductive resin layer so as to expose the second electrode layer to the second conductive resin layer through the one or more second openings.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

Figure 1:
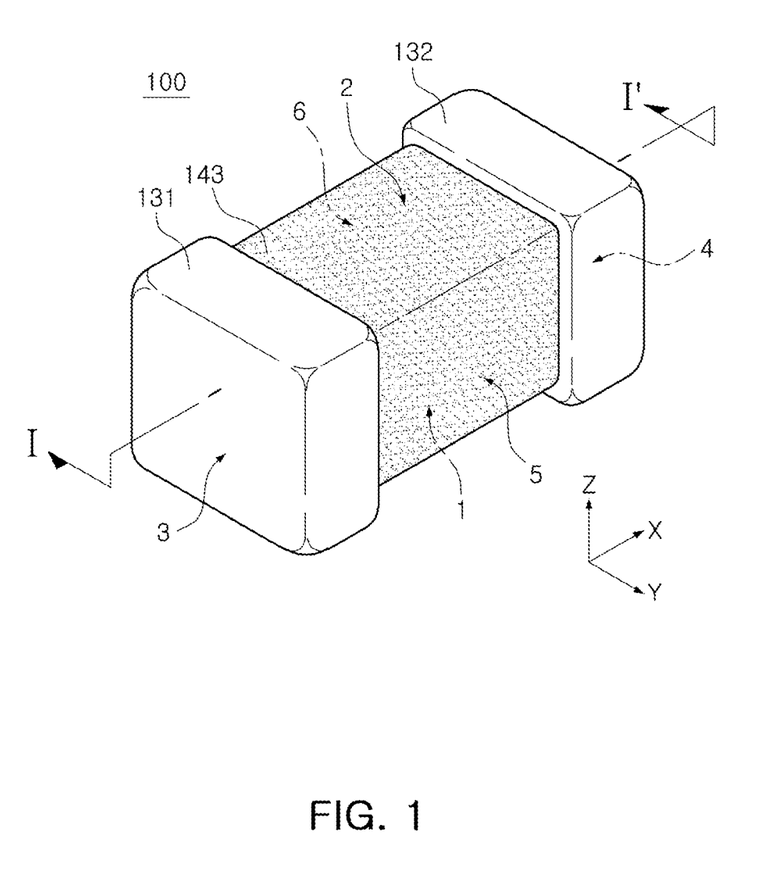
FIG. 1 is a schematic perspective view of a multilayer electronic component according to an exemplary embodiment of the present disclosure.

FIG. 1 is a schematic perspective view of a multilayer electronic component according to an exemplary embodiment.

Figure 2:
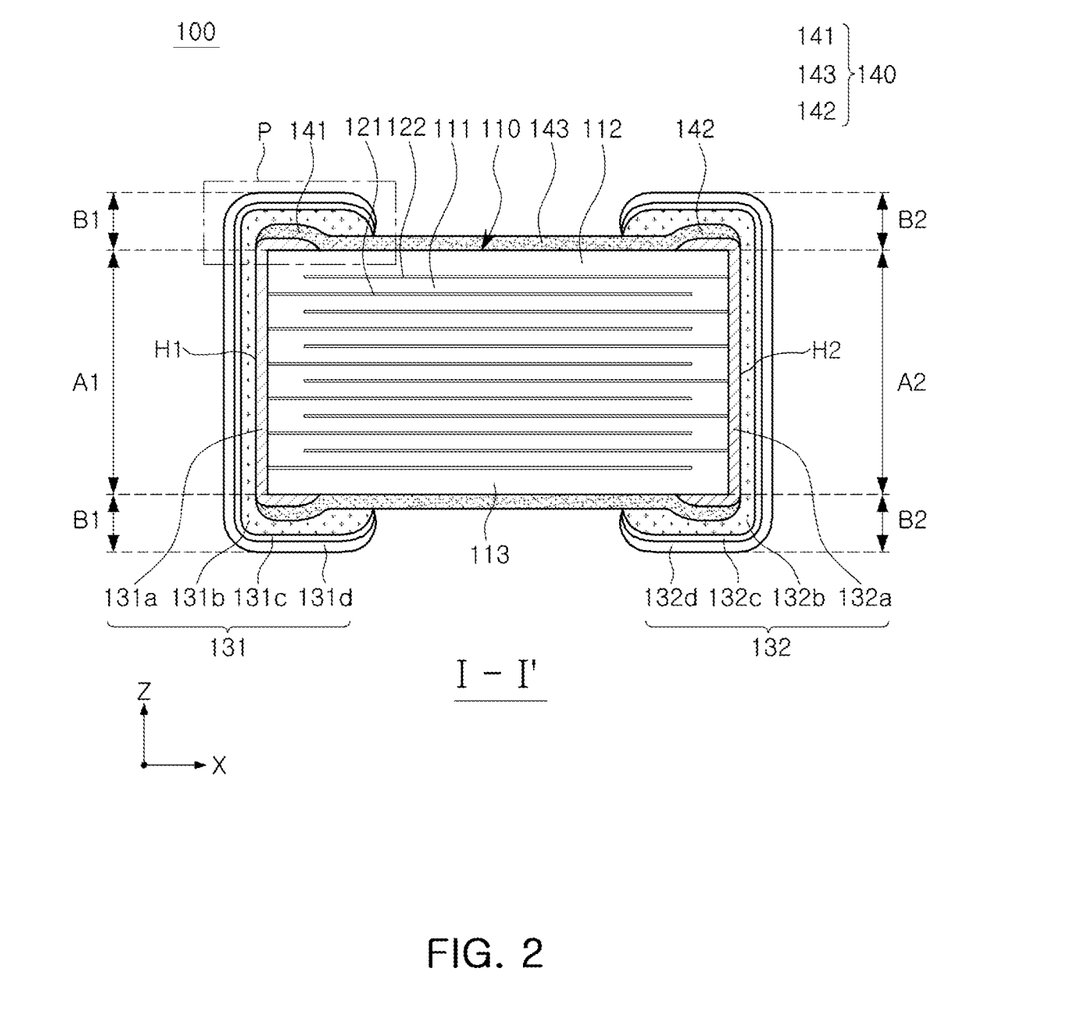
FIG. 2 is a cross-sectional view taken along line I-I' in FIG. 1.

FIG. 2 is a cross-sectional view taken along line I-I' in FIG. 1.

Figure 3:
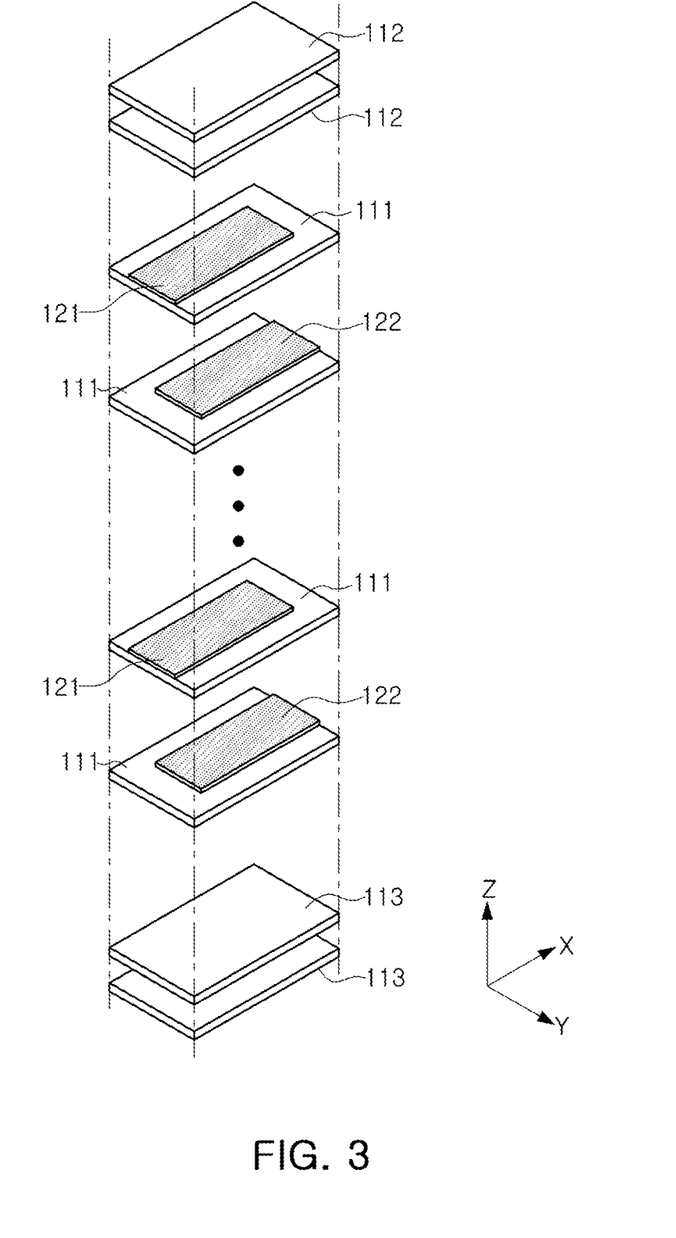
FIG. 3 is a schematic exploded perspective view of a body, in which dielectric layers and internal electrodes are stacked, according to an exemplary embodiment of the present disclosure.

FIG. 3 is a schematic exploded perspective view of a body, in which dielectric layers and internal electrodes are stacked, according to an exemplary embodiment.

Figure 4:
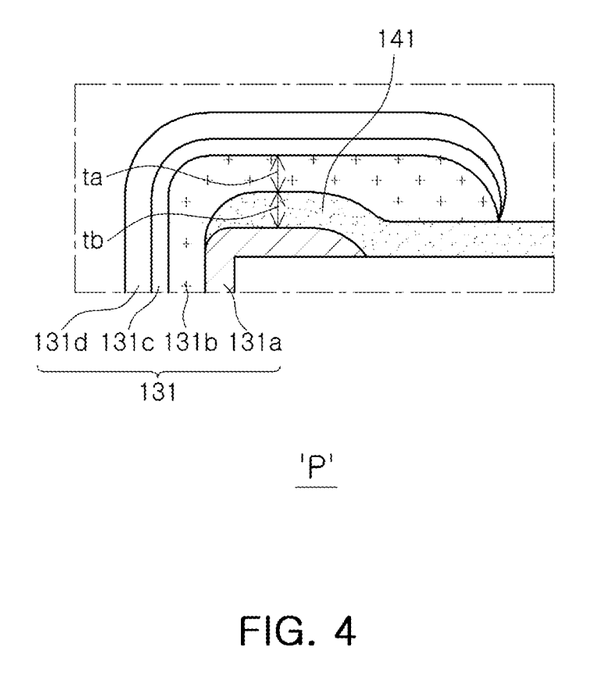
FIG. 4 is an enlarged view of region P in FIG. 2.

FIG. 4 is an enlarged view of region P in FIG. 2.

Hereinafter, a multilayer electronic component 100 according to an exemplary embodiment will be described with reference to FIGS. 1 to 4.

A multilayer electronic component 100 according to an exemplary embodiment may include a body 110 including dielectric layers 111, and first and second internal electrodes 121 and 122 alternately stacked with respective dielectric layers interposed therebetween, and having first and second surfaces 1 and 2 opposing each other in a stacking direction, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other. The multilayer electronic component 100 may further include a first external electrode 131 including a first electrode layer 131a connected to the first internal electrode 121 and a first conductive resin layer 131b disposed on the first electrode layer 131a, and having a first connection portion A1 disposed on the third surface 3 of the body 110 and a first band portion B1 extending from the first connection portion A1 to a portion of each of the first, second, fifth, and sixth surfaces 1, 2, 5, and 6. The multilayer electronic component 100 may further include a second external electrode 132 including a second electrode layer 132a connected to the second internal electrode 122 and a second conductive resin layer 132b disposed on the second electrode layer 132a, and having a second connection portion A2 disposed on the fourth surface 4 of the body 110 and a second band portion B2 extending from the second connection portion A2 to a portion of each of the first, second, fifth, and sixth surfaces 1, 2, 5, and 6. The multilayer electronic component 100 may still further include a silicon (Si) organic compound layer 140 having a body cover portion 143 disposed on a region of external surfaces of the body 110 between the first and second electrode layers 131a and 132a, a first extending portion 141 disposed to extend from the body cover portion 143 between the first electrode layer 131a and the first conductive resin layer 131b of the first band portion B1, and a second extending portion 142 disposed to extend from the body cover portion 143 between the second electrode layer 132a and the second conductive resin layer 132b of the second band portion B2.

In the body 110, the dielectric layers 111 and the internal electrodes 121 and 122 are alternately stacked.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have the first and second surfaces 1 and 2 opposing each other in a thickness direction (a Z direction), the third and fourth surfaces 3 and 4 connected to the first and second surfaces 1 and 2 and opposing each other in a width direction (a Y direction), and the fifth and sixth surfaces 5 and 6 connected to the first and second surfaces 1 and 2 and as well as to the third and fourth surfaces 3 and 4 and opposing each other in a length direction (an X direction).

The plurality of dielectric layers 111, constituting the body 110, is in a sintered state and may be integrated with each other such that boundaries therebetween may not be readily apparent without using a scanning electron microscope (SEM).

According to an exemplary embodiment, a raw material forming the dielectric layer 111 is not limited as long as sufficient capacitance may be obtained. For example, a barium titanate-based material, a lead composite perovskite-based material, a strontium titanate-based material, or the like, may be used.

Various ceramic additives, organic solvents, plasticizers, binders, dispersants, or the like may be added to the powder of barium titanate ($BaTiO_3$), and the like, according to the purpose of the present disclosure, as the material for forming the dielectric layer 111.

The body 110 may have a capacitance forming portion disposed in the body 110 and including the first and second internal electrodes 121 and 122, disposed to oppose each other with the dielectric layer 111 interposed therebetween, to form capacitance, and upper and lower protective layers 112 and 113 disposed above and below the capacitance forming portion.

The capacitance forming portion may contribute to capacitance formation of a capacitor, and may be formed by repeatedly laminating the plurality of first and second internal electrodes 121 and 122 with the dielectric layer 111 interposed therebetween.

The upper protective layer 112 and the lower protective layer 113 may be formed by laminating a single dielectric layer or two or more dielectric layers on upper and lower surfaces of the capacitance forming portion, respectively, in the vertical direction, and may basically play a role in preventing damage to the internal electrodes due to physical or chemical stress.

The upper protective layer 112 and the lower protective layer 113 may not include an internal electrode, and may include the same material as the dielectric layer 111.

The plurality of internal electrodes 121 and 122 may be disposed to oppose each other with the dielectric layer 111 interposed therebetween.

The internal electrodes 121 and 122 may include first and second internal electrodes 121 and 122 alternately disposed to oppose each other with respective dielectric layers interposed therebetween.

The first and second internal electrodes 121 and 122 may be exposed to the third and fourth surfaces 3 and 4, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

For example, the first internal electrode 121 is not connected to the second external electrode 132 and is connected to the first external electrode 131, and the second internal electrode 122 is not connected to the first external electrode 131 and is connected to the second external electrode 132. Thus, the first internal electrode 121 is formed to be spaced apart from the fourth surface 4 by a predetermined distance, and the second internal electrode 122 is formed to be spaced apart from the third surface 3 by a predetermined distance.

The first and second internal electrodes 121 and 122 may be electrically isolated from each other by the dielectric layer 111 disposed therebetween.

Referring to FIG. 3, the body 110 may be formed by alternately laminating the dielectric layer 111, on which the first internal electrode 121 is printed, and the dielectric layer 111, on which the second internal electrode 122 is printed, in a thickness direction (a Z direction) and sintering the dielectric layers 111.

The material forming the first and second internal electrodes 121 and 122 is not limited. For example, the first and second internal electrodes 121 and 122 may be formed using a conductive paste containing a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

The external electrodes 131 and 132 are disposed on the body 110 and include electrode layers 131a and 132a and conductive resin layers 131b and 132b.

The external electrodes 131 and 132 may include first and second external electrodes 131 and 132, respectively, connected to the first and second internal electrodes 121 and 122.

The first external electrode 131 includes a first electrode layer 131a and a first conductive resin layer 131b, and the second external electrode 132 includes a second electrode layer 132a and a second conductive resin layer 132b.

When the first external electrode 131 is divided depending on a position in which it is disposed, the first external electrode 131 has a first connection portion A1, disposed on the third surface 3 of the body, and a band portion B1 extending from the first connection portion A1 to a portion of the first, second, fifth, and sixth surfaces 1, 2, 5, and 6.

When the second external electrode 132 is divided depending on a position in which it is disposed, the second external electrode 132 has a second connection portion A2, disposed on the fourth surface 4 of the body, and a band portion B2 extending from the second connection portion A2 to a portion of the first, second, fifth, and sixth surfaces 1, 2, 5, and 6.

The first and second electrode layers 131a and 132a may be formed using any material as long as it is a material having electrical conductivity such as a metal or the like, and a specific material may be determined in consideration of electrical characteristics, structural stability, and the like.

For example, the first and second electrode layers 131a and 132a may include a conductive metal and glass.

A conductive metal, used for the electrode layers 131a and 132a, is not limited as long as it may be electrically connected to the internal electrodes 121 and 122 to form capacitance and may include at least one selected from the group consisting of, for example, copper (Cu), silver (Ag), nickel (Ni), and alloys thereof.

The electrode layers 131a and 132a may be formed by applying a conductive paste, prepared by adding a glass frit, to the conductive metal powder particles and sintering the conductive paste.

When the first and second electrode layers 131a and 132a include a conductive metal and glass, corner portions, at which the connection portions A1 and A2 and the band portions B1 and B2 meet, may be formed to be thin, or lifting may occur between ends of the band portions B1 and B2 and the body 110. Therefore, since humidity resistance reliability may be problematic, an effect of improving the humidity reliability may be more effective when the first and second electrode layers 131a and 132a include a conductive metal and glass.

The first and second electrode layers 131a and 132a may be formed by means of atomic layer deposition (ALD), molecular layer deposition (MLD), chemical vapor deposition (CVD) sputtering, or the like.

In addition, the electrode layers 131a and 132a may include a conductive metal and glass.

The conductive resin layers 131b and 132b may include a conductive metal and a base resin.

The conductive metal, included in the conductive resin layers 131b and 132b, serves to electrically connect the conductive resin layers 131b and 132b to the electrode layers 131a and 132a.

The conductive metal, included in the conductive resin layers 131b and 132b, is not limited as long as it may be electrically connected to the electrode layers 131a and 132a and may include at least one selected from the group consisting of, for example, copper (Cu), silver (Ag), nickel (Ni), and alloys thereof.

The conductive metal, included in the conductive resin layers 131b and 132b, may include at least one of spherical powder particles and flake powder particles. For example, the conductive metal may include only flake powder particles, or spherical powder particles, or a mixture of flake powder particles and spherical powder particles.

The spherical powder particles may have an incompletely spherical shape and may have, for example, a shape in which a ratio of a length of a major axis to a length of a minor axis (the major axis/the minor axis) is 1.45 or less.

The flake powder particles refer to powder particles, each having a flat and elongated shape, and is not limited to a specific shape and, for example, a ratio of a length of a major axis and a length of a minor axis (the major axis/the minor axis) may be 1.95 or more.

The lengths of the major axes and the minor axes of the spherical powder particles and the flake powder particles may be measured from an image obtained by scanning a cross section (an L-T cross section), taken from a central portion of a multilayer electronic component in a width (Y) direction, in X and Z directions with a scanning electron microscope (SEM).

The base resin, included in the conductive resin layers 131b and 132b, serves to secure adhesion and to absorb impact.

The base resin, included in the conductive resin layers 131b and 132b, is not limited as long as it has adhesion and impact absorption and is mixed with conductive metal powder particles to prepare a paste and may include, for example, an epoxy-based resin.

The first external electrode 131 may further include first plating layers 131c and 131d disposed on the first conductive resin layers 131b, and the second external electrode 132 may further include second plating layers 132c and 132d disposed on the second conductive resin layer 132b.

The first and second plating layers 131c, 131d, 132c, and 132d serve to improve mounting characteristics.

The first and second plating layers 131c, 131d, 132c, and 132d may be Ni plating layers or Sn plating layers, or may include Ni plating layers 131c and 132c and Sn plating layers 131d and 132d, respectively and sequentially formed on the first and second conductive layers 131b and 132b. Alternatively, the first and second plating layers 131c, 131d, 132c, and 132d may include a plurality of Ni plating layers and/or a plurality of Sn plating layers.

A silicon (Si) organic compound layer 140 has a body cover portion 143 disposed in a region, in which the first and second electrode layers 131a and 132a are not disposed, of external surfaces of the body 110, a first extending portion 141 disposed to extend from the body cover portion 143 between the first electrode layer 131a and the first conductive resin layer 131b of the first band portion B1, and a second extending portion 142 disposed to extend from the body cover portion 143 between the second electrode layer 132a and the second conductive resin layer 132b of the second band portion B2.

The Si organic compound layer 140 serves to prevent stress, generated when a substrate is deformed by thermal and physical impacts while the multilayer electronic component 100 is mounted on the substrate, from propagating to the body 110 and to prevent cracking.

In addition, the Si organic compound layer 140 serves to improve humidity resistance by blocking a humidity permeation path.

The base resin, included in the conductive resin layers 131b and 132b, also plays a role in absorbing impacts, but the role of the base resin is limited because the first conductive resin layer 131b and the second conductive resin layer 132b must be disposed to be insulated.

Meanwhile, since the body cover portion 143 does not include a conductive metal and is disposed in the region, in which the first and second electrode layers 131a and 132a are not disposed, of the external surface of the body 110, the body cover portion 143 is disposed in a wider region to be more effective in absorbing impact and suppressing stress propagation.

In addition, the body cover part 143 may prevent humidity from permeating into the body 110 through the external surface of the body 100 by sealing fine pores or cracking of the body 110.

The first extending portion 141 is disposed to extend from the body cover portion 143 between the first electrode layer 131a and the first conductive resin layer 131b of the first band part B1, serving to suppress stress propagation to the body 110 and to prevent cracking.

In addition, the first extending portion 141 serves to suppress lifting between an end of the first electrode layer 131a, disposed on the first band portion B1, and the body 110 to improve humidity resistance reliability.

The second extending portion 142 is disposed to extend from the body cover portion 143 between the second electrode layer 132a and the second conductive resin layer 132b of the second band portion B2, serving to suppress stress propagation to the body 110 and to prevent cracking.

In addition, the second extension portion 142 serves to improve humidity resistance reliability by suppressing lifting between an end of the second electrode layer 132a, disposed in the second band portion B2, and the body 110.

The Si organic compound layer 140 may be formed by forming the first and second electrode layers 131a and 132a in the body 110 including dielectric layers and internal electrodes, forming a silicon (Si) organic compound layer 140 on an exposed external surface of the body 110 and the connection portions A1 and A2 of the first and second electrode layers 131a and 132a, and removing the Si organic compound layer 140 formed on the connection portions A1 and A2 of the first and second electrode layers 131a and 132a.

A method of removing the organic compound layer 140 may be, for example, laser processing, mechanical polishing, dry etching, wet etching, shadowing deposition using a tape protective layer, or the like.

The Si organic compound layer 140 may include alkoxy silane.

Accordingly, the Si organic compound layer 140 has a polymeric form including a plurality of silicon carbide bonding structures, and has hydrophobicity.

The alkoxy silane prevents humidity permeation and contamination, and permeates into various inorganic substrates and is then cured to protect products and to increase durability. In addition, the alkoxy silane may react with a hydroxyl group (OH), and thus, may form a strong chemical bond to improve durability.

As compared with an epoxy resin or an inorganic compound, the epoxy resin is difficult to effectively suppress humidity permeation because it has no water repellent effect, a large amount of $CO_2$ gas may be generated during curing to cause lifting, and the inorganic compound has no functional group capable of reacting with a hydroxyl group when applied to a surface of the body 110, and thus, it is difficult to adhere to the surface of the body 110 and a chemical bond is not formed. Accordingly, it may be difficult to apply the epoxy resin or the inorganic compound to the present disclosure.

Therefore, as the Si organic compound layer 140 may include alkoxy silane, an effect of sealing fine pores or cracking may be further improved and bending stress and humidity resistance reliability may be further improved.

When a thickness of the first conductive resin layer 131b on the first electrode layer 131a of the first band portion B1 is defined as Ta and a thickness of the first extending portion 141 is defined as Tb, Tb/Ta may be 0.5 or more to 0.9 or less.

FIG. 4 is an enlarged view of region P in FIG. 2. Referring to FIG. 4, thicknesses of the first conductive resin layer 131b and the first extending portion 141 on the first electrode layer 131a of the first band portion B1 will be described in detail. However, the above detailed description may be identically applied to thicknesses of the second conductive resin layer 132b and the second extending portion 142 on the second electrode layer 132a of the second band portion B2.

After preparing sample chips while changing the ratio of the thickness Tb of the first extending portion 141 to the thickness Ta of the first conductive resin layer 131b on the first electrode layer 131a of the first band portion B1 (Tb/Ta), bending strength and equivalent series resistance (ESR) were evaluated, and the results are shown in Tables 1 and 2, respectively.

The bending strength was measured using a bending strength measuring method through a piezoelectric effect. After mounting samples of a multilayer ceramic capacitor on a substrate, a distance from a central portion pressed during bending was set to be 6 mm to observe whether cracking occurs in the sample chips. The number of sample chips, in which cracking occurred, to the total number of sample chips is shown.

According to the ESR evaluation, a sample chip was maintained at a temperature of −55° C. for 30 minutes and increased to a temperature of 125° C. and was then maintained for 30 minutes, which was one cycle. After 500 cycles were applied, a sample having ESR greater than 50 mΩ was determined to be defective. The number of sample chips having defective ESR to the total number of sample chips was shown.

TABLE 1

| | | Bending Strength Evaluation | | | | | |
|---|---|---|---|---|---|---|---|
| No. | Tb/Ta | A Lot | B Lot | C Lot | D Lot | E Lot | Sum |
| 1 | 0.3 | 1/60 | 0/60 | 0/60 | 2/60 | 0/60 | 3/300 |
| 2 | 0.5 | 0/60 | 0/60 | 0/60 | 0/60 | 0/60 | 0/300 |
| 3 | 0.7 | 0/60 | 0/60 | 0/60 | 0/60 | 0/60 | 0/300 |
| 4 | 0.9 | 0/60 | 0/60 | 0/60 | 0/60 | 0/60 | 0/300 |
| 5 | 1.1 | 0/60 | 0/60 | 0/60 | 0/60 | 0/60 | 0/300 |
| 6 | 1.3 | 0/60 | 0/60 | 0/60 | 0/60 | 0/60 | 0/300 |

Referring to Table 1, in Test No. 1 in which Tb/Ta was 0.3, cracking occurred in three sample chips among a total of 300 sample chips.

On the other hand, in Test Nos. 2 to 6 in which Tb/Ta was 0.5 or more, there was no sample chip in which cracking occurred. Accordingly, bending strength was excellent.

TABLE 2

| | | ESR Evaluation | | | | | |
|---|---|---|---|---|---|---|---|
| No. | Tb/Ta | A Lot | B Lot | C Lot | D Lot | E Lot | Sum |
| 1 | 0.3 | 0/320 | 0/320 | 0/320 | 0/320 | 0/320 | 0/1600 |
| 2 | 0.5 | 0/320 | 0/320 | 0/320 | 0/320 | 0/320 | 0/1600 |
| 3 | 0.7 | 0/320 | 0/320 | 0/320 | 0/320 | 0/320 | 0/1600 |
| 4 | 0.9 | 0/320 | 0/320 | 0/320 | 0/320 | 0/320 | 0/1600 |
| 5 | 1.1 | 5/320 | 0/320 | 3/320 | 0/320 | 3/320 | 11/1600 |
| 6 | 1.3 | 0/320 | 7/320 | 2/320 | 0/320 | 0/320 | 9/1600 |

Referring to Table 2, in Test No. 5 in which Tb/Ta was 1.1, an ESR defect occurred in eleven sample chips among a total of 1600 sample chips. In Test No. 6 in which Tb/Ta was 1.3, an ESR defect occurred in nine sample chips among a total of 1600 sample chips.

On the other hand, In Test Nos. 1 to 4 in which Tb/Ta was 0.9 or less, there was no sample chip in which an ESR defect occurred. Accordingly, ESR characteristics were excellent.

Therefore, to secure excellent ESR characteristics while improving bending strength, the ratio of the thickness Tb of the first extending portion 141 to the thickness Ta of the first conductive resin layer 131b on the first electrode layer 131a of the first band portion B1 (Tb/Ta) may be, in detail, 0.5 or more to 0.9 or less.

Figure 5:
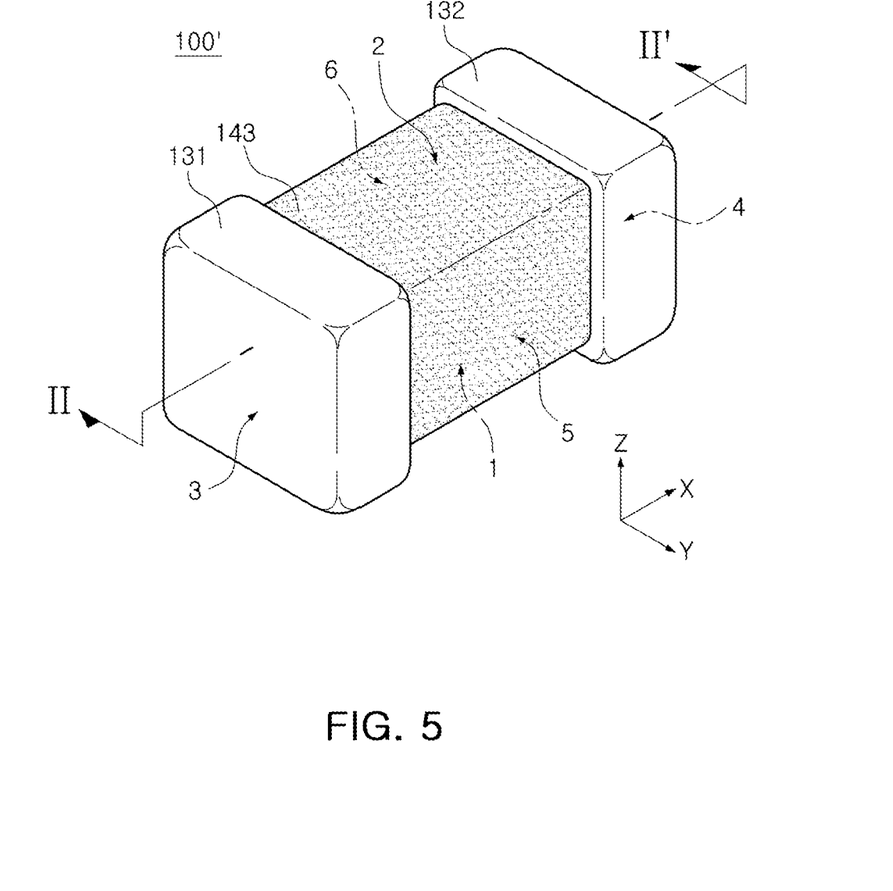
FIG. 5 is a schematic perspective view of a multilayer electronic component according to another exemplary embodiment of the present disclosure.

FIG. 5 is a schematic perspective view of a multilayer electronic component according to another exemplary embodiment.

Figure 6:
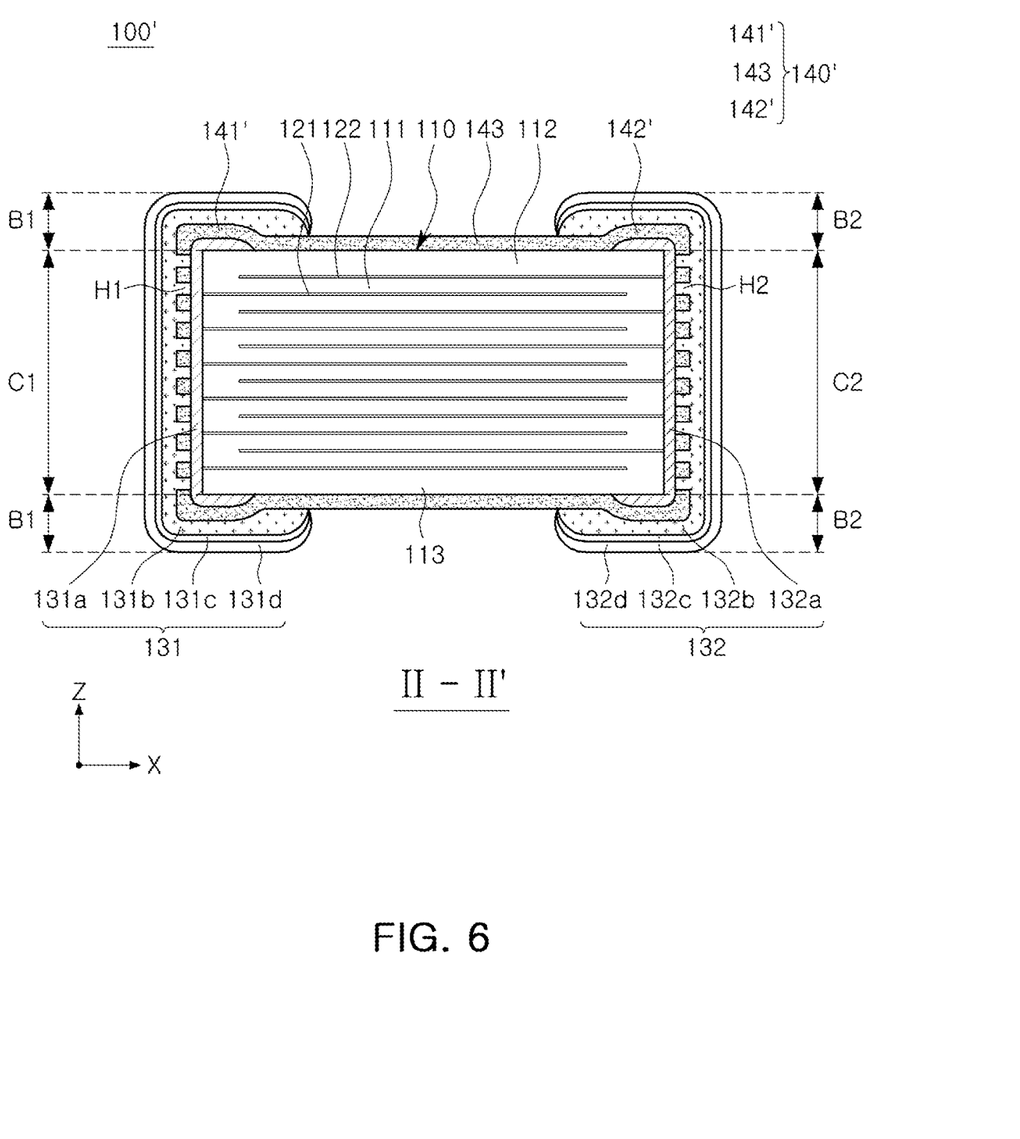
FIG. 6 is a cross-sectional view taken along line II-II' in FIG. 5.

FIG. 6 is a cross-sectional view taken along line II-II' in FIG. 5.

Figure 7:
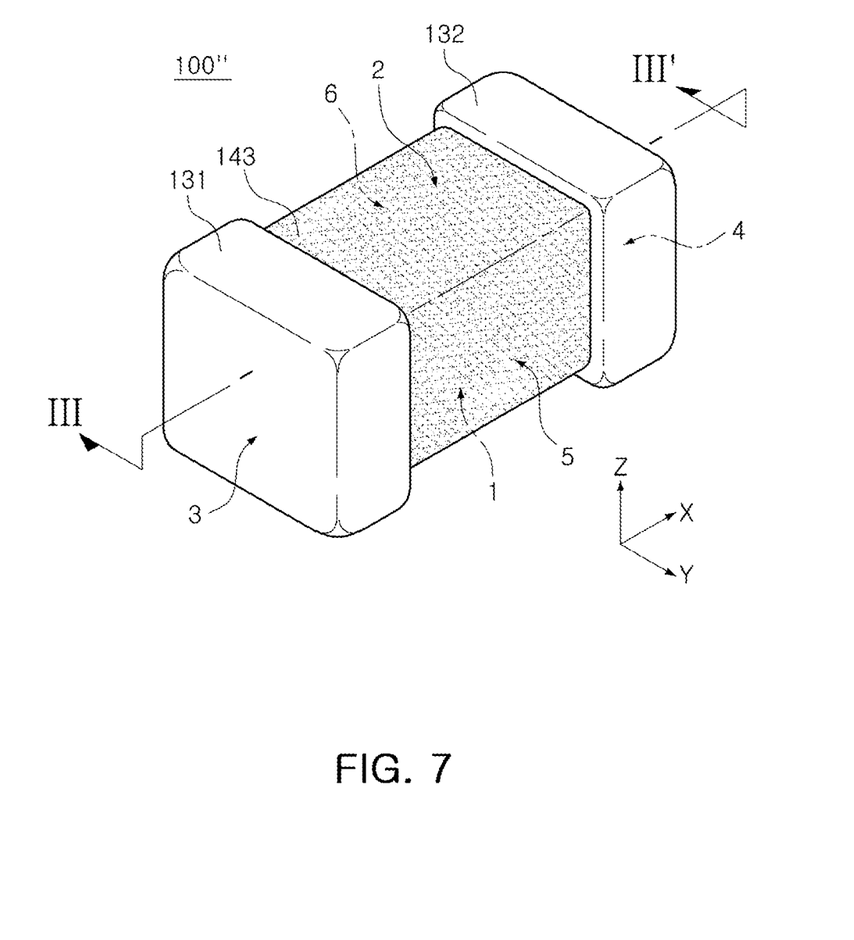
FIG. 7 is a schematic perspective view illustrating a modified example of a multilayer electronic component according to another exemplary embodiment of the present disclosure.

FIG. 7 is a schematic perspective view illustrating a modified example of a multilayer electronic component according to another exemplary embodiment.

Figure 8:
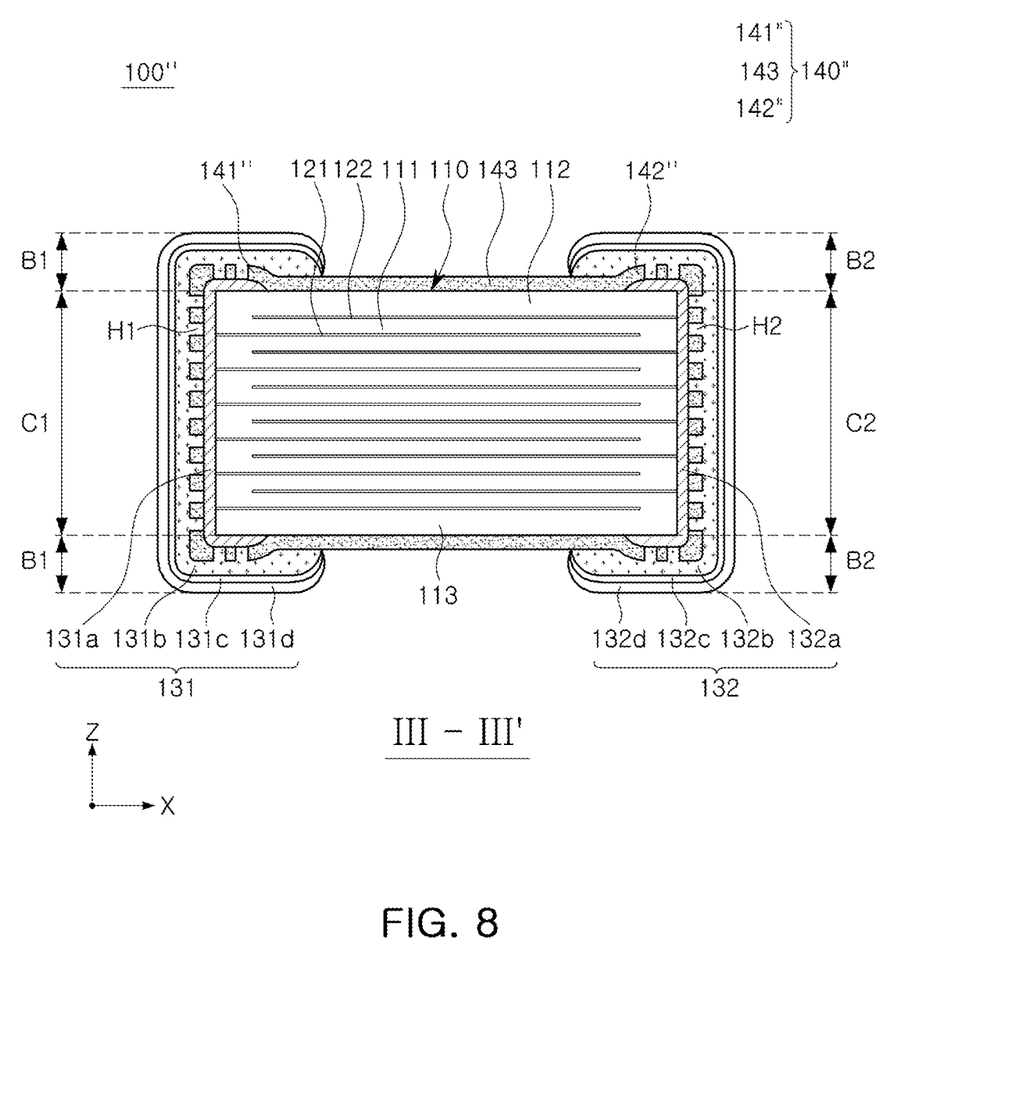
FIG. 8 is a cross-sectional view taken along line III-III' in FIG. 7.

FIG. 8 is a cross-sectional view taken along line III-III' in FIG. 7.

Hereinafter, a multilayer electronic component 100' according to another exemplary embodiment 100' and a modified example 100" thereof will be described with reference to FIGS. 5 to 8. However, descriptions common to the multilayer electronic component 100 according to the embodiment will be omitted to avoid duplicate descriptions.

A multilayer electronic component 100' according to an exemplary embodiment may include a body 110 including dielectric layers 111, and first and second internal electrodes 121 and 122 alternately stacked with respective dielectric layers interposed therebetween, and having first and second surfaces 1 and 2 opposing each other in a stacking direction, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other. The multilayer electronic component 100' may further include a first external electrode 131 including a first electrode layer 131a connected to the first internal electrode 121 and a first conductive resin layer 131b disposed on the first electrode layer 131a, and having a first connection portion C1 disposed on the third surface 3 of the body 110 and a first band portion B1 extending from the first connection portion C1 to a portion of each of the first, second, fifth, and sixth surfaces 1, 2, 5, and 6. The multilayer electronic component 100' may further include a second external electrode 132 including a second electrode layer 132a connected to the second internal electrode 122 and a second conductive resin layer 132b disposed on the second electrode layer 132a, and having a second connection portion C2 disposed on the fourth surface 4 of the body 110 and a second band portion B2 extending from the second connection portion C2 to a portion of each of the first, second, fifth, and sixth surfaces 1, 2, 5, and 6. The multilayer electronic component 100' may still further include a silicon (Si) organic compound layer 140' having a body cover portion 143 disposed in a region, in which the first and second electrode layers 131a and 132a are not disposed, of external surfaces of the body 110, a first extending portion 141' disposed to extend from the body cover portion 143 between the first electrode layer 131a and the first conductive resin layer 132b, and a second extending portion 142' disposed to extend from the body cover portion 143 between the second electrode layer 132a and the second conductive resin layer 132b. The first and second extending portions 141' and 142' have first and second openings H1 and H2, respectively.

The first conductive resin layer 131b may be in contact with the first electrode layer 131a through the first opening H1, and the second conductive resin layer 132b may be in contact with the second electrode layer 132a through the second opening H2. For example, the first opening H1 may be filled with the first conductive resin layer 131b, and the second opening H2 may be filled with the second conductive resin layer 132b.

The Si organic compound layer 140' may be formed by forming the first and second electrode layers 131a and 132a in the body 110 including dielectric layers and internal electrodes, forming a silicon (Si) organic compound layer on an exposed external surface of the body 110 and the first and second electrode layers 131a and 132a, and removing a portion of the Si organic compound layer formed on the first and second electrode layers 131a and 132a to form the first and second openings H1 and H2.

A method of removing a region, in which the openings H1 and H2 to be formed, may be, for example, laser processing, mechanical polishing, dry etching, wet etching, shadowing deposition using a tape protective layer, or the like.

In this case, an area of the first opening H1 may be 20 to 90% of an area of the first extending portion 141', an area of the second opening H2 may be 20 to 90% of an area of the second extending portion 142'.

When the area of the first opening H1 is less than 20% of the area of the first extending portion 141', electrical connectivity between the first electrode layer 131a and the first conductive resin layer 131b is deteriorated to increase ESR. On the other hand, when the area of the first opening H1 is greater than 90% of the area of the first extension portion 141', an effect of improving bending strength and humidity resistance reliability of the Si organic compound layer 140' may be insufficient.

When the area of the second opening H2 is less than 20% of the area of the second extending portion 142', electrical connectivity between the second electrode layer 132a and the second conductive resin layer 132b may be deteriorated to increase ESR. On the other hand, when the area of the second opening H2 is greater than 90% of the area of the second extending portion 142', an effect of improving the bending strength and the humidity resistance reliability of the Si organic compound layer 140' may be insufficient.

The first opening H1 may be disposed in any one or more of the first band portion B1 and the first connection portion C1 of the first electrode layer, and the second opening H2 may be disposed in any one or more of the second band portion B2 and the second connection portion C2.

As illustrated in FIG. 6, the first extending portion 141' may have a form in which the first opening portion H1 is only disposed in the first connecting portion A1, and the second extending portion 142' may have a form in which a second opening portion H2 is only disposed in the second connection portion C2.

In addition, as illustrated in FIG. 8, a multilayer electronic component 100" according to another exemplary embodiment may include a silicon (Si) organic compound layer 140" having a body cover portion 143 disposed in a region, in which the first and second electrode layers 131a and 132a are not disposed, of external surfaces of the body 110, a first extending portion 141" disposed to extend from the body cover portion 143 between the first electrode layer 131a and the first conductive resin layer 131b, and a second extending portion 142" disposed to extend from the body cover portion 143 between the second electrode layer 132a and the second conductive resin layer 132b. The first extending portion 141" may have a form in which the first opening portion H1 is disposed in both the first connection portion C1 and the first band portion B1, and the second extending portion 142"

may have a form in which the second opening H2 is disposed in both the second connection portion C2 and the second band portion B2.

The shape and the number of the openings H1 and H2 are not limited, and each of the openings H1 and H2 may have a shape such as a circle, a rectangle, an ellipse, a rectangle having rounded corners, and the like, and may have an irregular shape.

As described above, a multilayer electronic component may include a silicon (Si) organic compound layer having a body cover portion disposed in a region, in which electrode layers are not disposed, of external surfaces of a body, and an extending portion disposed to extend from the body cover portion between an electrode layer and a conductive resin layer of an external electrode, and thus, may improve bending strength.

In addition, the Si organic compound layer may be provided to improve humidity resistance reliability.

While embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers, and first and second internal electrodes alternately stacked with respective dielectric layers interposed therebetween, the body having first and second surfaces opposing each other in a stacking direction, third and fourth surfaces connected to the first and second surfaces and opposing each other, and fifth and sixth surfaces connected to the first to fourth surfaces and opposing each other;
a first external electrode including a first electrode layer connected to the first internal electrode and a first conductive resin layer disposed on the first electrode layer, the first external electrode having a first connection portion disposed on the third surface of the body and a first band portion extending from the first connection portion to a portion of each of the first, second, fifth, and sixth surfaces;
a second external electrode including a second electrode layer connected to the second internal electrode and a second conductive resin layer disposed on the second electrode layer, the second external electrode having a second connection portion disposed on the fourth surface of the body and a second band portion extending from the second connection portion to a portion of each of the first, second, fifth, and sixth surfaces; and
a silicon (Si) organic compound layer having a body cover portion disposed on a region of external surfaces of the body between the first and second electrode layers, a first extending portion extending from the body cover portion to a region between the first electrode layer and the first conductive resin layer of the first band portion, and a second extending portion extending from the body cover portion to a region between the second electrode layer and the second conductive resin layer of the second band portion,
wherein Tb is smaller than Ta, where a thickness of the first conductive resin layer on the first electrode layer of the first band portion is defined as 'Ta' and a thickness of the first extending portion is defined as 'Tb', and
end portions of the first extending portion are disposed in the connection parts, and do not cover internal electrodes in length direction.

2. The multilayer electronic component of claim 1, wherein the Si organic compound layer includes alkoxy silane.

3. The multilayer electronic component of claim 1, wherein the first and second conductive resin layers include a conductive metal and a base resin.

4. The multilayer electronic component of claim 1, wherein the first and second electrode layers include a conductive metal and glass.

5. The multilayer electronic component of claim 1, wherein the first external electrode further includes a first plating layer disposed on the first conductive resin layer, and
the second external electrode further includes a second plating layer disposed on the second conductive resin layer.

6. The multilayer electronic component of claim 1, wherein the first extending portion does not extend between the first electrode layer and the first conductive resin layer of the first connection portion, and the second extending portion does not extend between the second electrode layer and the second conductive resin layer of the second connection portion.

7. The multilayer electronic component of claim 1, wherein the Si organic compound layer is disposed on the first, second, fifth, and sixth surfaces of the body.

8. The multilayer electronic component of claim 7, wherein the Si organic compound layer is disposed on the first electrode layer of the first connection portion and disposed on the second electrode layer of the second connection portion.

9. The multilayer electronic component of claim 1, wherein the first and second extending portions have first and second openings, respectively.

10. The multilayer electronic component of claim 9, wherein the first conductive resin layer is in contact with the first electrode layer through the first opening, and
the second conductive resin layer is in contact with the second electrode layer through the second opening.

11. The multilayer electronic component of claim 9, wherein an area of the first opening is 20 to 90% of an area of the first extending portion, and
an area of the second opening is 20 to 90% of an area of the second extending portion.

12. The multilayer electronic component of claim 9, wherein the first opening is disposed in at least one of the first band portion or the first connection portion, and
the second opening is disposed in at least one of the second band portion or the second connection portion.

13. The multilayer electronic component of claim 9, the first opening is one or more, and the second opening is one or more.

14. The multilayer electronic component of claim 13, wherein the one or more first openings and the one or more second openings are provided as a plurality of discrete openings spaced apart from one another.

15. The multilayer electronic component of claim 13, wherein the one or more first and second openings are arranged in only regions corresponding to the third and fourth surfaces of the body.

16. The multilayer electronic component of claim 13, wherein the one or more first openings are arranged in an entire region between the first electrode layer and the first conductive resin layer, and
wherein the one or more second openings are arranged in an entire region between the second electrode layer and the second conductive resin layer.

* * * * *